(12) United States Patent
Carlisle et al.

(10) Patent No.: US 10,607,169 B1
(45) Date of Patent: Mar. 31, 2020

(54) METHOD, APPARATUS, AND COMPUTER PROGRAM PRODUCT FOR PROGRAMMATICALLY UPDATING DATA FOR COMMUNICATION TO A SOCIAL NETWORK SYSTEM

(71) Applicant: Groupon, Inc., Chicago, IL (US)

(72) Inventors: Jason Carlisle, Seattle, WA (US);
Alberto Holts Corey, Santiago (CL);
Ari Alhadeff, Issaquah, WA (US);
Vinay P. Vaidya, Chicago, IL (US);
Shuoyuan Lin, Chicago, IL (US);
Xuan Zheng, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 1035 days.

(21) Appl. No.: 14/968,056

(22) Filed: Dec. 14, 2015

Related U.S. Application Data

(60) Provisional application No. 62/091,198, filed on Dec. 12, 2014.

(51) Int. Cl.
*G06Q 30/02* (2012.01)
*G06Q 10/06* (2012.01)
*G06Q 50/00* (2012.01)

(52) U.S. Cl.
CPC ... *G06Q 10/06312* (2013.01); *G06Q 30/0202* (2013.01); *G06Q 30/0246* (2013.01); *G06Q 50/01* (2013.01)

(58) Field of Classification Search
CPC ........ G06Q 10/06312; G06Q 30/0246; G06Q 50/01; G06Q 30/0202

USPC ....................................................... 705/7.31
See application file for complete search history.

(56) References Cited

U.S. PATENT DOCUMENTS

| | | | |
|---|---|---|---|
| 8,706,548 B1* | 4/2014 | Blume | G06Q 30/0256 705/14.1 |
| 2002/0128908 A1* | 9/2002 | Levin | G06Q 30/02 705/14.53 |
| 2006/0074749 A1* | 4/2006 | Kline | G06Q 30/02 705/14.48 |
| 2009/0271266 A1* | 10/2009 | Regmi | G06O 20/209 705/14.44 |

(Continued)

*Primary Examiner* — Nadja N Chong Cruz
(74) *Attorney, Agent, or Firm* — Alston & Bird LLP

(57) ABSTRACT

Provided herein are systems, methods and computer readable media for programmatically updating budgeting data, target consumer profile data, and promotion component data for communication to a social network system. An example method may include transmitting, via a social network system interface, budgeting data, target consumer profile data, and promotion component data to the social network system, receiving, at a promotion and marketing system, consumer transaction data, consumer redemption data, and consumer-promotion interaction data, determining, via the promotion and marketing system, at least one of updated budgeting data, updated target consumer data, and updated promotion component data based on the consumer transaction data, the consumer redemption data, and the consumer-promotion interaction data, and transmitting, via the social network system interface, the updated budgeting data, the updated target consumer profile data, and the updated promotion component data to the social network system.

33 Claims, 10 Drawing Sheets

(56) References Cited

U.S. PATENT DOCUMENTS

2012/0059702 A1* 3/2012 Yoder .................... G06Q 30/02
                                                                                      705/14.17
2014/0100929 A1* 4/2014 Burgess ................ G06Q 30/02
                                                                                      705/14.17

* cited by examiner

GROUPON   Create an Ad   Ads   Leaderboard

Last Week Leaderboard

| User | Total GR | Total Spent | E%GR | Activations | Activation Rate | Rank |
|---|---|---|---|---|---|---|
| name01@email.com | $$$$$$ | $$$$$$ | 96% | 1,197 | 36.2% | 1 |
| name02@email.com | $$$$$ | $$$$$$ | 93% | 1,004 | 32.9% | 2 |
| name03@email.com | $$$$$ | $$$$$ | 91% | 987 | 29.5% | 3 |
| name04@email.com | $$$$ | $$$$$ | 89% | 899 | 28.3% | 4 |
| name05@email.com | $$$$ | $$$$ | 86% | 853 | 24.7% | 5 |
| name06@email.com | $$$$ | $$$$ | 82% | 785 | 21.1% | 6 |
| name07@email.com | $$$ | $$$$ | 81% | 725 | 19.7% | 7 |
| name08@email.com | $$$ | $$$$ | 78% | 657 | 19.4% | 8 |
| name09@email.com | $$$ | $$$ | 77% | 629 | 18.8% | 9 |
| name10@email.com | $$$ | $$$ | 74% | 602 | 18.5% | 10 |
| name11@email.com | $$ | $$$ | 69% | 579 | 18.2% | 11 |
| name12@email.com | $$ | $$ | 63% | 556 | 17.6% | 12 |
| name13@email.com | $$ | $$ | 55% | 511 | 17.2% | 13 |
| name14@email.com | $ | $ | 52% | 402 | 16.4% | 14 |
| name15@email.com | $ | $ | 44% | 393 | 15.8% | 15 |
| name16@email.com | $ | $ | 36% | 386 | 15.2% | 16 |

METHOD, APPARATUS, AND COMPUTER PROGRAM PRODUCT FOR PROGRAMMATICALLY UPDATING DATA FOR COMMUNICATION TO A SOCIAL NETWORK SYSTEM

CROSS REFERENCES TO RELATED APPLICATIONS

This application claims the benefit of U.S. Provisional Patent Application No. 62/091,198, filed on Dec. 12, 2014, the entire contents of which are incorporated herein by reference.

FIELD

Example embodiments of the present invention generally relate to providing systems, apparatuses, methods, and user interfaces for programmatically and in real-time updating one or more of budgeting data, target consumer profile data, and promotion component data for communication to a social network system.

BACKGROUND

Conventional social network impression management systems generally transmit proscribed data to a social network system. Costs may run high while the social network impression management system continues to underperform expectations. In this regard, areas for improving current social network impression management systems have been identified. Through applied effort, ingenuity, and innovation, solutions to improve such systems have been realized and are described in connection with embodiments of the present invention.

BRIEF SUMMARY

In general, embodiments of the present invention provided herein include systems, methods, apparatuses, and user interfaces for enabling a social network impression management system to programmatically and in real-time, update one or more of budgeting data, target consumer profile data, and promotion component data, based on consumer transaction data, consumer redemption data, and consumer-promotion interaction data, for communication to a social network system.

In some embodiments, an apparatus for programmatically updating budgeting data, target consumer profile data, and promotion component data for communication to a social network system may be provided, the apparatus comprising a processor including one or more processing devices configured to perform independently or in tandem to execute hard-coded functions or execute software instructions, a user interface, a communications module, and a memory comprising one or more volatile or non-volatile electronic storage devices storing computer-readable instructions configured to programmatically update budgeting data, target consumer profile data, and promotion component data, the computer-readable instructions being configured, when executed, to cause the processor to transmit, via the communications module, budgeting data, target consumer profile data, and promotion component data to the social network system, receiving, via the communications module, consumer transaction data, consumer redemption data, and consumer-promotion interaction data, determining, via the processor, at least one of updated budgeting data, updated target consumer data, and updated promotion component data based on the consumer transaction data, the consumer redemption data, and the consumer-promotion interaction data, and transmitting, via the communications module, the updated budgeting data, the updated target consumer profile data, and the updated promotion component data to the social network system.

In some embodiments, the memory stores computer-readable instructions that, when executed, cause the processor to capture the consumer transaction data, the consumer redemption data, and the consumer-promotion interaction data, and clean the consumer transaction data, the consumer redemption data, and the consumer-promotion interaction data for utilization in the determination of the at least one of updated budgeting data, updated target consumer data, and updated promotion component data. In some embodiments, the memory stores computer-readable instructions that, when executed, cause the processor to calculate performance data based on one or more of the consumer transaction data, the consumer redemption data, and the consumer-promotion interaction data.

In some embodiments, the memory stores computer-readable instructions that, when executed, cause the processor to at a predefined review time, access the performance data, compare the performance data to a predetermined threshold, determine, via the processor, whether the predetermined threshold is being met, and in an instance in which the predetermined threshold is not being met, cancel the transmission of budgeting data, target consumer profile data, and promotion component data. In some embodiments, the determination of one or more of the updated budgeting data, the updated target consumer data, and the updated promotion component data is based on comparison to the performance data, the performance data calculated based on at least one of the consumer transaction data, the consumer redemption data, and the consumer-promotion interaction data.

In some embodiments, the memory stores computer-readable instructions that, when executed, cause the processor to at a predefined review time, access the performance data, compare the performance data to a predetermined threshold in advance of the determination of the updated budgeting data, the updated target consumer data, and the updated promotion component data, determine, at the promotion and marketing system, whether the predetermined threshold is being met, and in an instance in which the predetermined threshold is being met, determining the updated budgeting data, the updated target consumer data, and the updated promotion component data.

In some embodiments, the memory stores computer-readable instructions that, when executed, cause the processor to provide display data configured for display, the display data indicative of the performance data.

In some embodiments, the performance data is a number of conversions and the predefined review time is related to a number of clicks, and in an instance in which the number of conversions does not meet the predetermined threshold after the number of clicks has been determined, canceling the transmission of budgeting data, target consumer profile data, and promotion component data.

In some embodiments, the performance data is an impression volume and the predefined review time is related to a cost per click, and in an instance in which the impression volume does meet the predetermined threshold at the cost per click, determining the updated budgeting data, the updated target consumer data, and the updated promotion component data.

In some embodiments, the performance data is an activation rate and the predefined review time is related to a predetermined preview time period, and in an instance in which the activation rate does meet the predetermined threshold at the predetermined preview time period, determining the updated budgeting data, the updated budgeting data having an increased budget over a next predetermined time period.

In some embodiments, the performance data is cost divided by incremental value and the predetermined threshold is 100%, and in an instance in which the cost divided by incremental value does meet the predetermined threshold at the predefined review time, determining the updated budgeting data, the updated budgeting data having an decreased budget until a next predefined review time.

In some embodiments, a method for programmatically updating budgeting data, target consumer profile data, and promotion component data for communication to a social network system may be provided, the method comprising transmitting, via a social network system interface, budgeting data, target consumer profile data, and promotion component data to the social network system, receiving, at a promotion and marketing system, consumer transaction data, consumer redemption data, and consumer-promotion interaction data, determining, via the promotion and marketing system, at least one of updated budgeting data, updated target consumer data, and updated promotion component data based on the consumer transaction data, the consumer redemption data, and the consumer-promotion interaction data, and transmitting, via the social network system interface, the updated budgeting data, the updated target consumer profile data, and the updated promotion component data to the social network system.

In some embodiments, the method may further comprise capturing the consumer transaction data, the consumer redemption data, and the consumer-promotion interaction data, and cleaning the consumer transaction data, the consumer redemption data, and the consumer-promotion interaction data for utilization in the determination of the at least one of updated budgeting data, updated target consumer data, and updated promotion component data.

In some embodiments, the method may further comprise calculating performance data based on one or more of the consumer transaction data, the consumer redemption data, and the consumer-promotion interaction data.

In some embodiments, the method may further comprise at a predefined review time, accessing the performance data, comparing the performance data to a predetermined threshold, determining, at the promotion and marketing system, whether the predetermined threshold is being met, and in an instance in which the predetermined threshold is not being met, canceling the transmission of budgeting data, target consumer profile data, and promotion component data.

In some embodiments, the determination of one or more of the updated budgeting data, the updated target consumer data, and the updated promotion component data is based on comparison to the performance data, the performance data calculated based on at least one of the consumer transaction data, the consumer redemption data, and the consumer-promotion interaction data.

In some embodiments, the method may further comprise at a predefined review time, accessing the performance data, comparing the performance data to a predetermined threshold in advance of the determination of the updated budgeting data, the updated target consumer data, and the updated promotion component data, determining, at the promotion and marketing system, whether the predetermined threshold is being met, and in an instance in which the predetermined threshold is being met, determining the updated budgeting data, the updated target consumer data, and the updated promotion component data.

In some embodiments, the method may further comprise providing display data configured for display, the display data indicative of the performance data.

In some embodiments, the performance data is a number of conversions and the predefined review time is related to a number of clicks, and in an instance in which the number of conversions does not meet the predetermined threshold after the number of clicks has been determined, canceling the transmission of budgeting data, target consumer profile data, and promotion component data.

In some embodiments, the performance data is an impression volume and the predefined review time is related to a cost per click, and in an instance in which the impression volume does meet the predetermined threshold at the cost per click, determining the updated budgeting data, the updated target consumer data, and the updated promotion component data.

In some embodiments, the performance data is an activation rate and the predefined review time is related to a predetermined preview time period, and in an instance in which the activation rate does meet the predetermined threshold at the predetermined preview time period, determining the updated budgeting data, the updated budgeting data having an increased budget over a next predetermined time period.

In some embodiments, the performance data is cost divided by incremental value and the predetermined threshold is 100%, and in an instance in which the cost divided by incremental value does meet the predetermined threshold at the predefined review time, determining the updated budgeting data, the updated budgeting data having an decreased budget until a next predefined review time.

In some embodiments, a computer program product configured for programmatically updating budgeting data, target consumer profile data, and promotion component data for communication to a social network system may be provided, the computer program product comprising at least one computer-readable storage medium having computer-executable program code instructions stored therein, the computer-executable program code instructions comprising program code instructions for transmitting, via a social network system interface, budgeting data, target consumer profile data, and promotion component data to the social network system, receiving, at a promotion and marketing system, consumer transaction data, consumer redemption data, and consumer-promotion interaction data, determining, via the promotion and marketing system, at least one of updated budgeting data, updated target consumer data, and updated promotion component data based on the consumer transaction data, the consumer redemption data, and the consumer-promotion interaction data, and transmitting, via the social network system interface, the updated budgeting data, the updated target consumer profile data, and the updated promotion component data to the social network system.

In some embodiments, the computer-executable program code instructions further comprise program code instructions for capturing the consumer transaction data, the consumer redemption data, and the consumer-promotion interaction data, and cleaning the consumer transaction data, the consumer redemption data, and the consumer-promotion interaction data for utilization in the determination of the at least one of updated budgeting data, updated target consumer data, and updated promotion component data.

In some embodiments, the computer-executable program code instructions further comprise program code instructions for calculating performance data based on one or more of the consumer transaction data, the consumer redemption data, and the consumer-promotion interaction data.

In some embodiments, the computer-executable program code instructions further comprise program code instructions for at a predefined review time, accessing the performance data, comparing the performance data to a predetermined threshold, determining, at the promotion and marketing system, whether the predetermined threshold is being met, and in an instance in which the predetermined threshold is not being met, canceling the transmission of budgeting data, target consumer profile data, and promotion component data.

In some embodiments, the determination of one or more of the updated budgeting data, the updated target consumer data, and the updated promotion component data is based on comparison to the performance data, the performance data calculated based on at least one of the consumer transaction data, the consumer redemption data, and the consumer-promotion interaction data.

In some embodiments, the computer-executable program code instructions further comprise program code instructions for at a predefined review time, accessing the performance data, comparing the performance data to a predetermined threshold in advance of the determination of the updated budgeting data, the updated target consumer data, and the updated promotion component data, determining, at the promotion and marketing system, whether the predetermined threshold is being met, and in an instance in which the predetermined threshold is being met, determining the updated budgeting data, the updated target consumer data, and the updated promotion component data.

In some embodiments, the computer-executable program code instructions further comprise program code instructions for providing display data configured for display, the display data indicative of the performance data.

In some embodiments, the performance data is a number of conversions and the predefined review time is related to a number of clicks, and in an instance in which the number of conversions does not meet the predetermined threshold after the number of clicks has been determined, canceling the transmission of budgeting data, target consumer profile data, and promotion component data.

In some embodiments, the performance data is an impression volume and the predefined review time is related to a cost per click, and in an instance in which the impression volume does meet the predetermined threshold at the cost per click, determining the updated budgeting data, the updated target consumer data, and the updated promotion component data.

In some embodiments, the performance data is an activation rate and the predefined review time is related to a predetermined preview time period, and in an instance in which the activation rate does meet the predetermined threshold at the predetermined preview time period, determining the updated budgeting data, the updated budgeting data having an increased budget over a next predetermined time period.

In some embodiments, the performance data is cost divided by incremental value and the predetermined threshold is 100%, and in an instance in which the cost divided by incremental value does meet the predetermined threshold at the predefined review time, determining the updated budgeting data, the updated budgeting data having an decreased budget until a next predefined review time.

BRIEF DESCRIPTION OF THE SEVERAL VIEWS OF THE DRAWINGS

Figure 1:
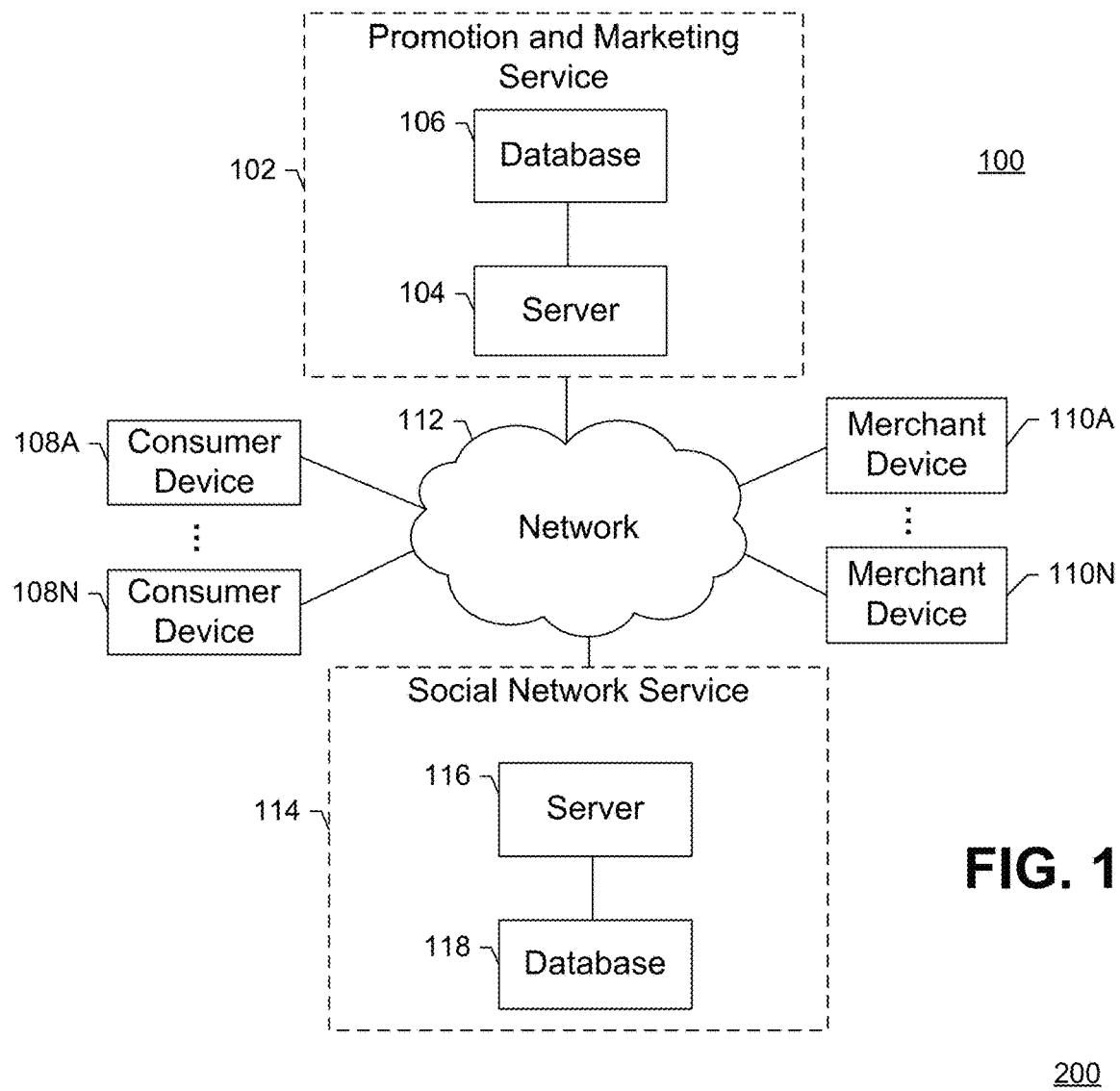
Figure 2:
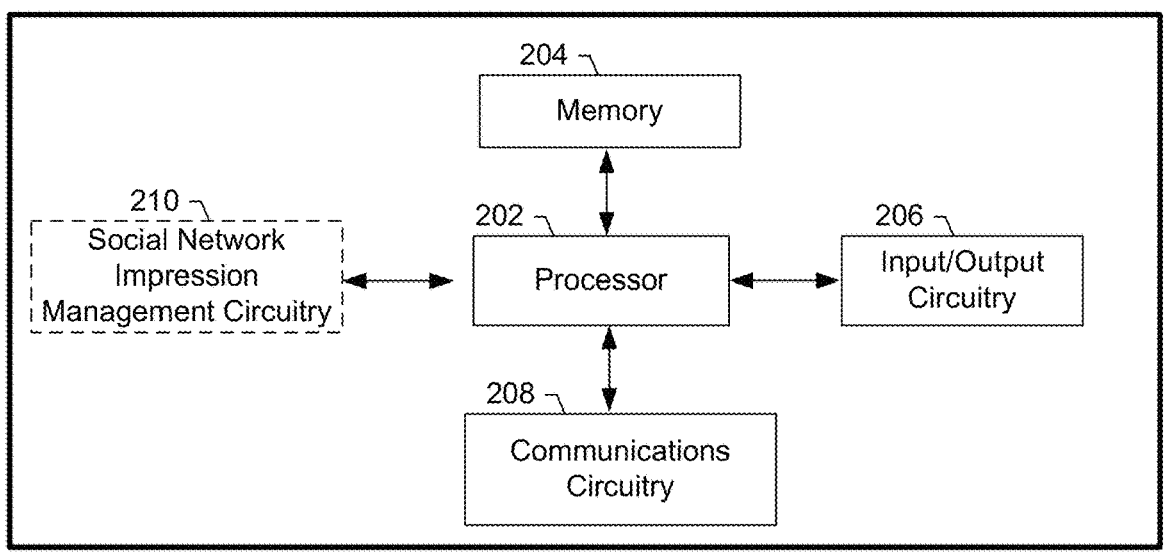
Figure 3:
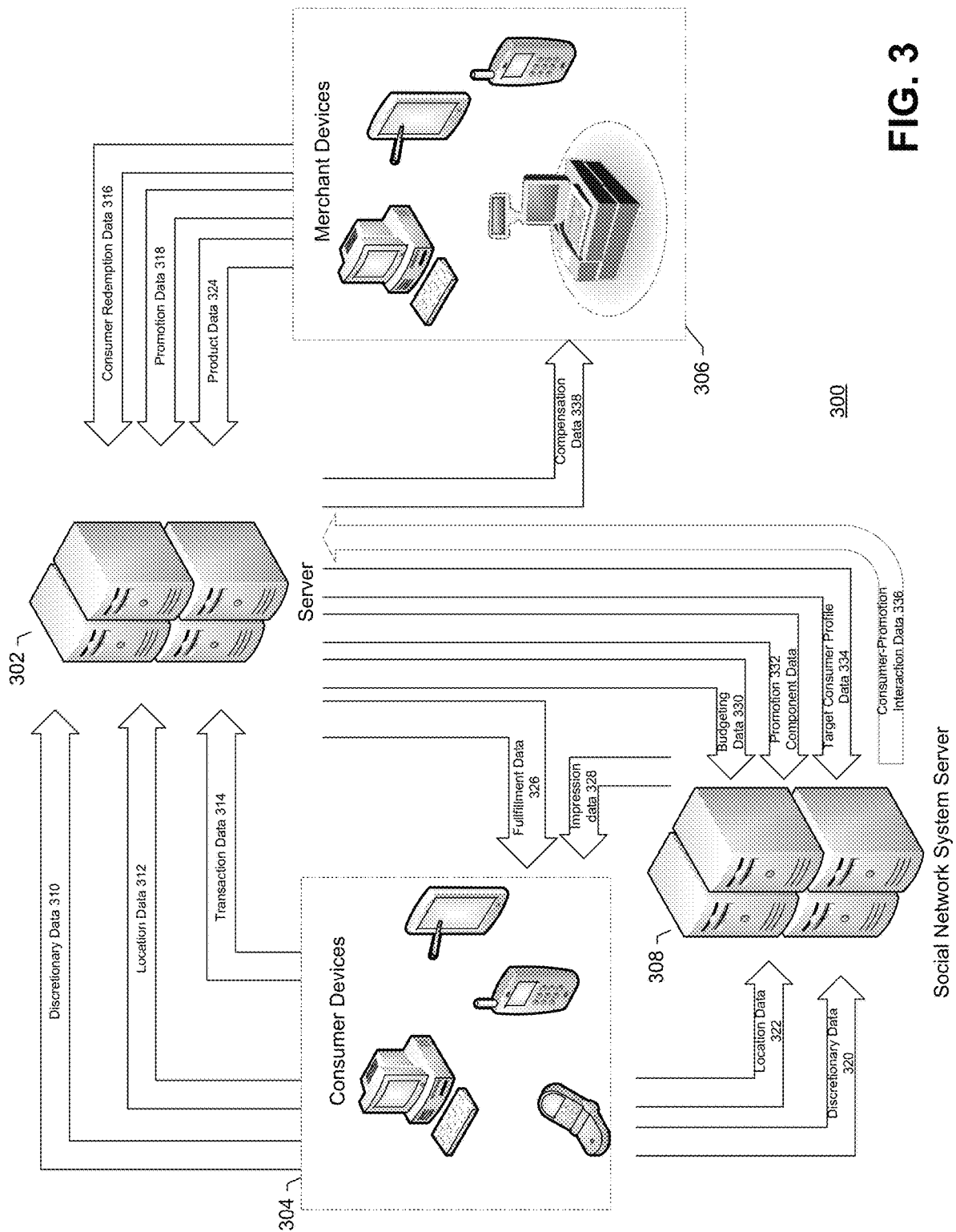
Figure 4:
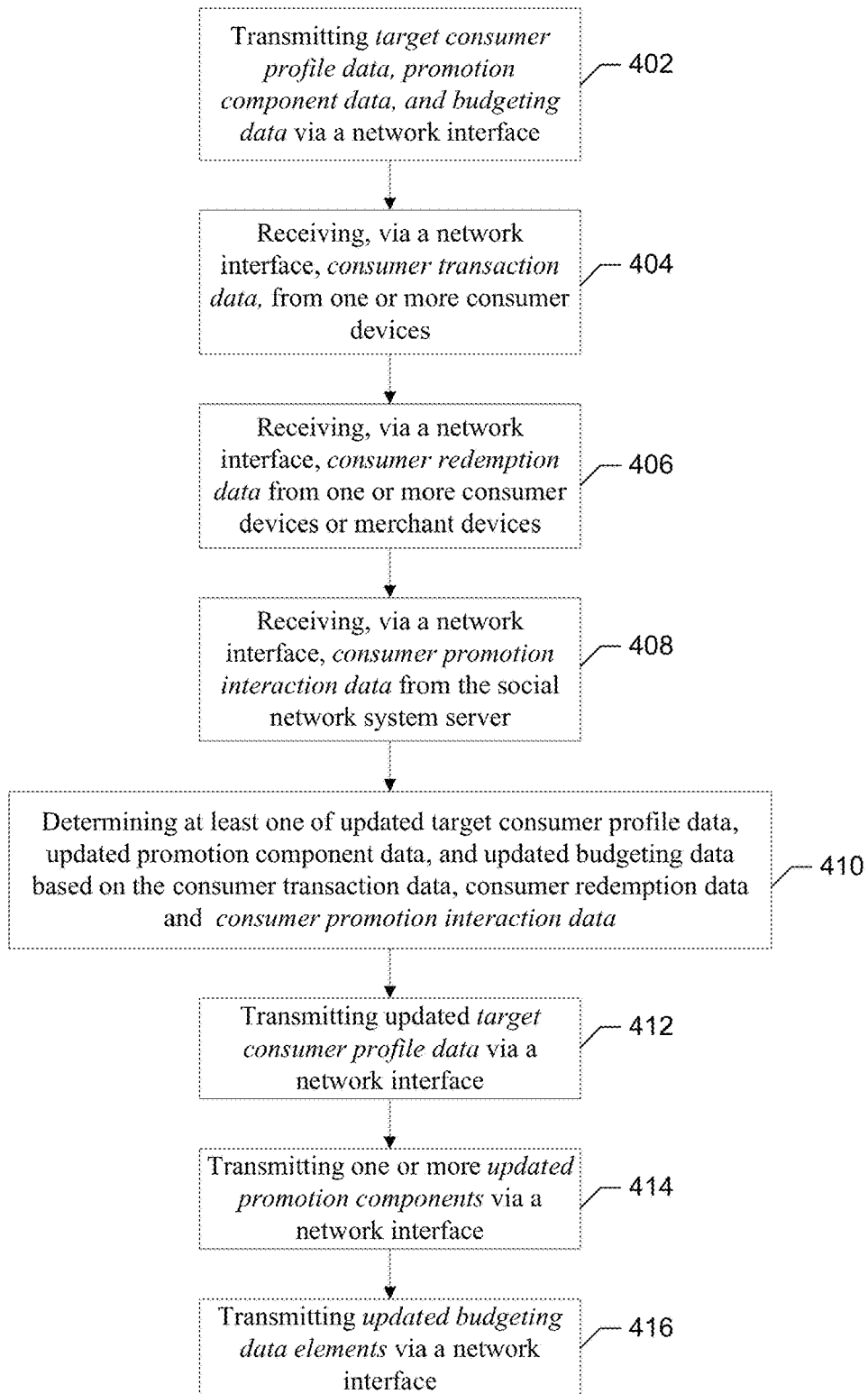
Figure 5:
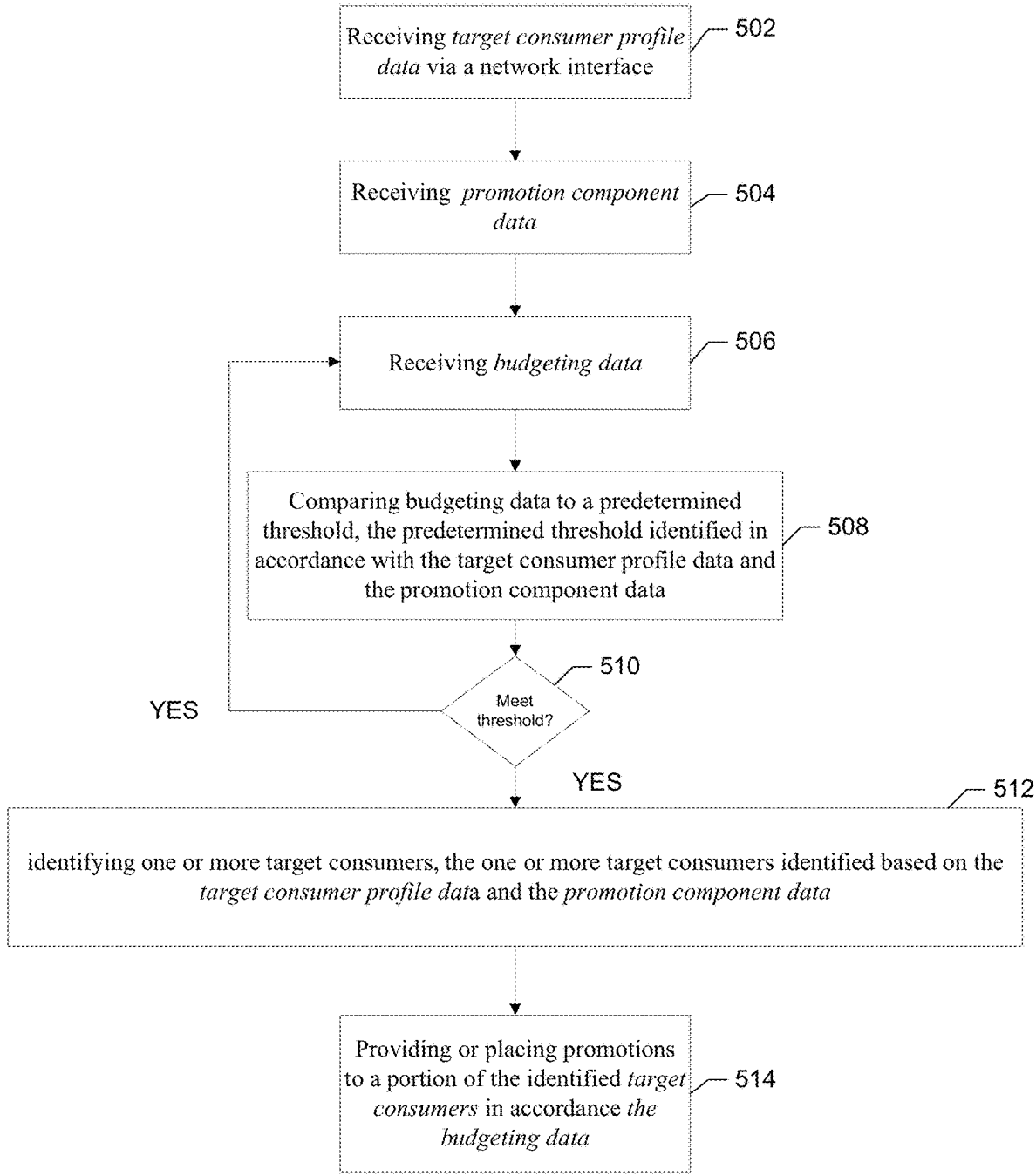
Figure 6:
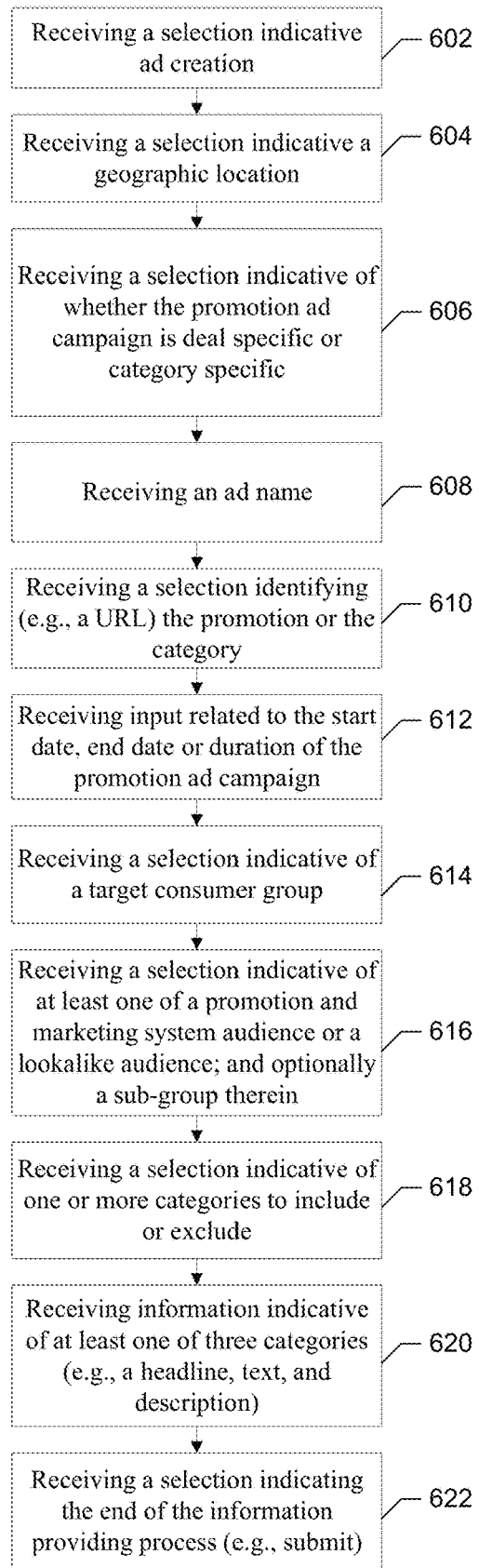
Figure 6:
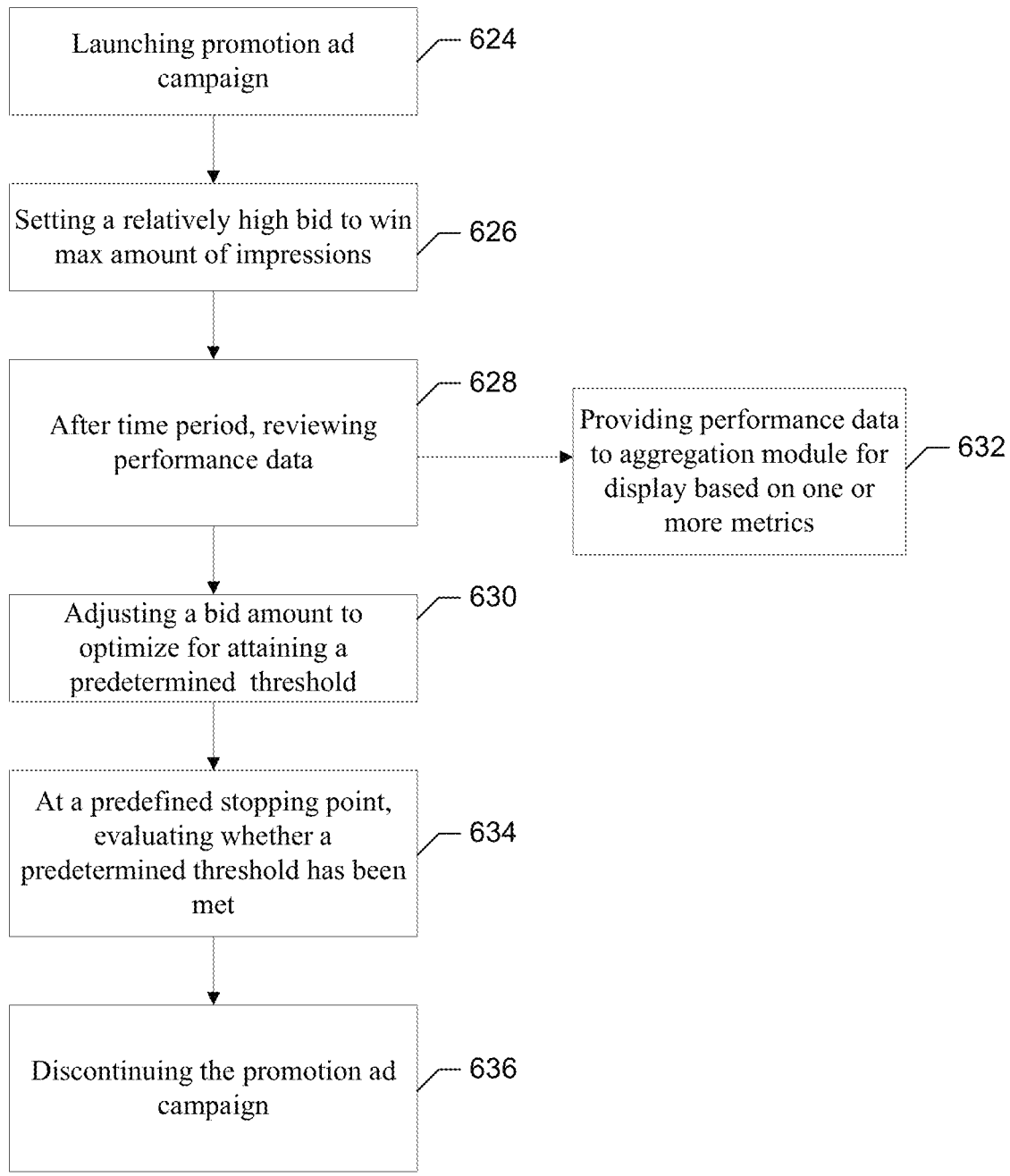

Having thus described some embodiments in general terms, reference will now be made to the accompanying drawings, which are not necessarily drawn to scale, and wherein:

FIG. 1 illustrates an example system within which embodiments of the present invention may operate;

FIG. 2 shows a block diagram showing an example device for implementing a social network impression management system using special-purpose circuitry in accordance with some example embodiments of the present invention;

FIG. 3 shows an example data flow among a consumer device, a promotion and marketing service server, a social network system server, and a merchant device in accordance with some example embodiments of the present invention;

FIG. 4 shows a flow chart of an example method, performed in accordance with some embodiments;

FIG. 5 shows a flow chart of an example method, performed in accordance with some embodiments;

FIG. 6 shows a flow chart of an example method, performed in accordance with some embodiments; and FIGS. 7A-7I show example graphical user interface displays that may be presented by various components of systems, in accordance with some embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Overview

Various embodiments of the present invention are directed to improved systems, apparatuses, methods, user interfaces, and computer readable media for configuring a social network impression management system to programmatically and in real-time, update one or more of budgeting data, target consumer profile data, and promotion component data, based on a high-speed programmatic analysis of consumer transaction data, consumer redemption data, and consumer-promotion interaction data, for communication to a social network system. More particularly, various embodiments of the present invention enable programmatic and real time or near real time adjustment of particular data for enabling optimization of a social network impression management system. In some embodiments, the social network impression management system may periodically monitor one or more of the consumer transaction data, consumer redemption data, and consumer-promotion interaction data associated with a particular promotion, and update one or more of the budgeting data, target consumer profile data, and promotion component data associated with the particular promotion's impression delivery accordingly. The adjustment may be based on the reception, from one or more consumer devices, merchant devices or social network systems, and/or analysis of at least one of consumer transaction data, consumer redemption data, and consumer-promotion interaction data.

In one particular example embodiment, a user of a social network impression management system may be a merchant, a consumer, an employee or agent of promotion and marketing system and may provide target consumer profile data and promotion component data. Budgeting data may also be provided, or in some embodiments, default budgeting data may be used. The target consumer profile data, the promotion component data, and the budgeting data may then be transmitted to a social network service system. The social network service system may receive the data, compare the data to one or more predetermined threshold values or the like, and provide electronic marketing communications accordingly. The promotion and marketing system may then monitor consumer transaction data, consumer redemption data, and consumer-promotion interaction data over a period of time, and using this information, update or adjust one or more of the budgeting data, the target consumer profile data, and the promotion component data. The consumer transaction data, the consumer redemption data, and the consumer-promotion interaction data may continue to be monitored and the budgeting data, the target consumer profile data, and the promotion component data may continue to be adjusted.

Advantageously, a promotion and marketing system may identify whether the marketing efforts (e.g., costs associated with electronic marketing communication delivery) are having their intended effect and what specifically, the effects are. The marketing efforts may then be adjusted accordingly.

Glossary

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions or electronic marketing communications, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with electronic marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications (defined below) including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be determined based on electronic communication delivered through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), consumer-promotion interaction data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like. As used herein, "transaction data" may refer to and/or include "consumer transaction data" and "consumer redemption data". Particularly, as used herein, "consumer transaction data" may refer to electronic information indicating that a transaction has occurred and "consumer redemption data" may refer to electronic information indicating that a promotion has been redeemed (e.g., activations). In some embodiments, both "consumer transaction data" and "consumer redemption data" may also include information relating to the transaction, such as consumer payment or billing information, transaction location data, consumer shipping information, items purchased by the consumer, item level data associated with the transaction, transaction location information, transaction date and time information, a merchant rewards account number associated with the consumer, the type of shipping selected by the consumer for fulfillment of the transaction, or the like as discussed above.

As used herein, the term "location data" refers to electronic information indicating a particular location. Location data may be associated with a consumer, a merchant, or any other entity capable of interaction with the promotion and marketing service. For example, in some embodiments location data is provided by a location services module of a mobile device (e.g., a consumer mobile device, a merchant mobile device, etc.). In some embodiments, location data may be provided by a merchant device indicating the location of consumers within their retail location. In some embodiments, location data may be provided by a merchant device to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, Wi-Fi access point identification systems, video surveillance systems, radio frequency identification (RFID) location systems, cell tower triangulation location systems, or Global Positioning Service (GPS) systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, food preferences, allergies, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, "consumer-promotion interaction data" refers to electronic information provided by a social network service system explicitly to the promotion and marketing service indicating interactions between users (e.g., consumers, merchants, etc.) and electronic marketing communications of the social network service and, in some embodiments, a level of the interaction. Interactions may include, without limitation, electronic indicators, mouse overs, clicking a link (e.g., clicks), selecting particular text or image data, and/or inputting or entering data. In some embodiments, "consumer-promotion interaction data" may include data indicating a location of a consumer at the time of interaction, data indicating a period of time of the interaction, and/or data indicating a date, time of day, or other time metric at the time of the interaction. The "consumer-promotion interaction data" may be any data that may be tracked, captured, and/or identified by the social network service system and accessed by or transmitted to the promotion and marketing service.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like. As used herein, "promotion component data" may refer to electronic information comprising one or more promotion components.

As used herein, the term "electronic marketing communication" refers to any electronically generated information content provided by the promotion and marketing service to a consumer for the purpose of communicating a promotion to the consumer. Electronic marketing communications may include any email, short message service (SMS) message, web page, application interface, or the like.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with promotion identifying content programmatically selected, generated, or recorded via an electronic process and initiated by an electronic system to notify a consumer of a particular promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including promotion focused marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "social network service" or "social network service system" may be separate and distinct from the promotion and marketing service. The term "social network service" may include a system or service that is accessible via one or more computing devices whereby a consumer may follow or interact with one or more other members of a social network. In some examples, the social network service may be more generally related to a content provider system operable to provide one or more types of content to a consumer, facilitate a consumer accessing, tracking, viewing and/or listening to one or more types of content, facilitate one or more types of interactions for a consumer, and/or the like. In some examples, the social network system may be embodied as system facilitating access to television, video, and/or music services whereby a consumer may view and/or listen to television, video, and/or music content, develop libraries of television, video, and/or music content, share television, video, and/or music content with other consumers, make recommendations of television, video, and/or music content, and the like.

The social network system may be embodied as a system providing a platform for a consumer to discover, track, collect, tag, and/or share interests in topics, projects, content, activities, and the like. In other examples, the social network system may be embodied as a system providing a platform for travel activities such as discovering travel opportunities, making travel arrangements, purchasing travel related fares, activities, experiences, lodging, etc., sharing travel activities and/or information, providing travel recommendation and/or reviews, and the like. In some examples, the social network system may be embodied as a system providing a marketplace for discovering, purchasing, providing recommendations and/or reviews, and the like for a variety of goods and services.

As used herein, the term "social network impression management system" may refer to an electronically deployed system or service that is configured to programmatically manage the placement, delivery, and/or provision of electronic marketing communications to users (e.g., consumers) of one or more social network service systems. The social network impression management system may programmatically define electronic marketing communications having programmatically determined promotion components and which are aimed to achieve a desired number of electronic marketing communications. In some embodiments, the social network management system may programmatically determine promotion components, "target consumer profile data", and "budgeting data", each of which is described below.

As used herein, the term "target consumer profile data" may refer to a set of characteristics for a targeted social network service user group. "Target consumer profile data" may be comprised of characteristics that a social network service may track, capture, extract, identify, and/or create that are associated with a social network user and that may be used by the social network service to identify selected groups of social network users for electronic marketing communication delivery such as for example age, gender, income, location, or proximity to a location. "Target consumer profile data" may also include characteristics such as time of day, consumer device operating system, internet access method, or the like. In some embodiments, "target consumer profile data" may include information regarding recent online activity, such as previous key word searches, visited websites, and the like.

As used herein, the term "budgeting data" may refer to one or more of an initial budget (e.g., USD/day), a selection of either Pay-Per-Mille (PPM, or cost per 1,000 electronic marketing communications) or Pay-Per-Click (PPC), and a bid amount. In some embodiments, "budgeting data" may also include electronic data indicative of an objective (e.g., promotion purchase, promotion redemption, clicks to website, website conversions, application installs, application engagement, event responses, desired number of electronic marketing communications, likes, page posts, and the like).

As used herein, the term "performance data" refers to electronic data that may be calculated using the consumer transaction data, the consumer redemption data, and the consumer-promotion interaction data. In some embodiments, the "performance data" may be analyzed and/or used in the determination of one or more of updated budgeting data, updated target consumer profile data, and updated promotion component data. In some embodiments, "performance data" may be one type of the consumer transaction data, the consumer redemption data, and the consumer-promotion interaction data.

In some embodiments, "budgeting data" may be used in the calculation of "performance data". For example, performance data may include (1) "Cost" which may refer to the total cost of the placement, (2) "Total GR" which may refer to revenue of the promotion and marketing service, "Total Spent" which may refer to the total amount spent on the social network impression management system, "E % GR" which may refer to Cost divided by Total GR, "Clicks" which may refer to the amount of time a targeted consumer mouses over and selects an impression, "Impressions" which may refer to the amount of an impression is delivered to a targeted consumer by the social network service, "Activations" which may refer to the amount of promotions that are purchased by a new and/or first-time customer based on a targeted consumer clicking an electronic marketing communication, "Activation Rate" which may refer to the ratio of Conversions to Activations, "Cost/Activation" which may refer to the ratio of cost of the social network impression management system to the amount of activations, "CTR" which may refer to click through rate or Clicks divided by Impressions, "Conversions" which may refer to the amount of promotions that are purchased based on a targeted consumer clicking an electronic marketing communication, "CPC" which may refer to Cost divided by Clicks (a.k.a. cost per click), "CVR" which may refer to conversion rate (the ratio of Conversions to Clicks), "NET GB" which may refer to Net Gross Bookings or the amount of bookings generated, and "Rank" which may refer to the place a user earns in a stack-ranked list based upon a desired success metric or particular type of performance data, such as Net GB or Incremental Value (e.g., 1').

Other performance data may include "Incremental Value" which may refer to the dollar profit generated by a social network impression management system after one or more expenses (e.g., shipping, credit card fees, etc.) are accounted for, and "E % IV" which may refer to the amount Cost divided by the Incremental Value from the social network impression management system.

Technical Underpinnings and Implementation of Exemplary Embodiments

Merchants, including manufacturers, wholesalers, and retailers, have spent a tremendous amount of time, money, manpower, and other resources to determine the best way to market their products to consumers. To this end, the use of a promotion and marketing service has helped the marketing process. While merchants would typically have to perform costly market research such as focus groups, surveys, and the like to obtain detailed information on consumer preferences and demographics, the digital age has provided a wealth of new consumer information that may be used to optimize the marketing and sales process.

Programmatically creating, identifying, curating, and transmitting electronic marketing communications to a targeted consumer audience is a complex and difficult technological challenge to overcome for a promotion and marketing service. In many cases, the inventors have determined that these services are constrained by technological obstacles unique to the electronic nature of the services provided, such as constraints on data storage, machine communication and processor resources.

One specific problem unique to the electronic nature of the programmatic creation, identification, curation, and transmission of electronic marketing communications to a targeted consumer audience is the capturing, storing, verifying, and cleaning of discretionary data, location data, transaction data, consumer redemption data, promotion data, product data, and consumer-promotion interaction data. More specifically, because data is rarely transmitted to a promotion and marketing system, from a trusted source, in the same format as that of use by the promotion of marketing system, the data must be verified and cleaned. Thus, in many embodiments, data must be captured from, for example, the web, one or more merchant or user devices, a social network service, or the like, and then, in many embodiments, must be stored, verified and/or cleaned or otherwise manipulated for use by the promotion and marketing system.

Another specific problem unique to the electronic nature of the services herein arises in the performance of associating data from one or more sources (e.g., multiple devices) related to one or more consumers in order to accurately identify consumer interests, preferences, and make other inferential determinations. That is, the promotion and marketing service, in many embodiments, must be configured to identify, track, and store data originating from a consumer's use of, for example, a web browser on first device and/or data originating from the use of, for example, a mobile application on a second device. Various embodiments may be configured to handle two example consumer access scenarios that prove difficult. The first scenario is referred to herein as a "multi-user single device" scenario and involves a single client device that is used by multiple consumers. The second scenario referred to herein is the "single user multiple device" scenario, which involves a single consumer using multiple client devices.

Another specific problem unique to the electronic nature of the services herein is the programmatic analysis of consumer data and associating the consumer data to target consumer profile data. That is, consumer data may be captured from, for example, a number of network sources, and is often not in a format suitable for matching and/or comparing directly with target consumer profile data. To perform the complex task of associating consumer data to target consumer profile data, the consumer data, in many embodiments, must be normalized, weighted, and/or balanced.

Furthermore, as noted above, one of the primary functions of a social network impression management system is programmatically and in real-time, update one or more of budgeting data, target consumer profile data, and promotion component data. Thus, even once the above-identified problems are solved, other problems do exist. The inventors have determined that existing techniques may not always leverage available information in a time efficient manner, which may result in continued spending when the results of which are often unknown or undeterminable. Accordingly, the inventors have determined that even technological methods that leverage a promotion and marketing service for the delivery of electronic marketing communications and/or placement of impressions fail to address problems associated with programmatically and in real-time, providing relevant electronic marketing communications to consumers.

In response to these problems and other problems, the inventors have identified methods and apparatuses for providing a social network impression management system configured to programmatically and in real-time, update one or more of budgeting data, target consumer profile data, and promotion component data, based on a high-speed programmatic analysis of consumer transaction data, consumer redemption data, and consumer-promotion interaction data. That is, embodiments of the present invention as described herein serve to offer improved delivery techniques, thus providing improvements to promotion and marketing services that address problems arising out of the electronic nature of those services.

Accordingly, to leverage improved impression delivery techniques available in social network services, as well as additional consumer data tracked, captured, extracted, identified and created by such systems, a promotion and marketing service may utilize the electronic marketing communication delivery functionality offered by or supported by the social network service (e.g., the payment for placement of an electronic marketing communication) to implement a social network impression management system.

To this end, unlike conventional marketing techniques related to the use of paper or other physical media (e.g., coupons clipped from a weekly newspaper), or those offered by a promotion and marketing service, a social network impression management system offers a wealth of additional electronic solutions to improve the experience in electronic marketing communication delivery.

For example, the ability to closely monitor feedback from the delivery of impressions provides the ability for the promotion and marketing service to gather data related to the time, place, and manner in which the consumer engaged with the electronic marketing communication (e.g., viewed, clicked, moused-over) and obtained and/or redeemed the promotion. The promotion and marketing service may use this information to programmatically and in real-time, update one or more of budgeting data, target consumer profile data, and promotion component data, based on consumer transaction data, consumer redemption data, and consumer-promotion interaction data, such as, for example, determining an adjustments that may improve the performance of the electronic communication delivery. In other words, the promotion and marketing service may programmatically and in real time dynamically monitor and adjust budgeting data, target consumer data, and promotion components, ensuring that the promotion and marketing service and/or merchant receives a positive return on their investment.

In one exemplary embodiments, the promotion and marketing service may transmit, via a social network service interface or the like, budgeting data, target consumer profile data, and promotion components to a social network service. The promotion and marketing service may then monitor consumer transaction data, consumer redemption data, and consumer-promotion interaction data and programmatically and in real time, determine and transmit updated budgeting data, updated target consumer profile data, and updated promotion component data based on the consumer transaction data, consumer redemption data, and consumer-promotion interaction data. With traditional marketing techniques, the adjustment of budgeting data, target consumer profile data, and promotion components based on real time monitoring consumer transaction data, consumer redemption data, and consumer-promotion interaction data is impossible.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as a promotion and marketing service 102. Additionally or alternatively, the promotion and marketing service 102 may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. A promotion and marketing service 102 may communicate, via a network 112 (e.g., the Internet, or the like), with computer devices 108A-108N, merchant devices 110A through 110N, and a social network service 114. Merchants may access a promotion and marketing service 102 via a network 112 using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106 and the social network service 114 may comprise a server 116 in communication with a database 118.

The server 104 may be embodied as a computer or computers as known in the art. The server 104 may provide for receiving of electronic data from various sources, including but not necessarily limited to the consumer devices 108A-108N, the merchant devices 110A-110N, and the social network service 114. For example, the server 104 may be operable to receive and process clickstream data, including consumer transaction data and consumer redemption data, provided by the consumer devices 108 and/or the merchant devices 110 and consumer-promotion interaction data provided by the social network service 102. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The server 116 may be embodied as a computer or computers as known in the art. The server 116 may provide for receiving of electronic data from various sources, including but not necessarily limited to the consumer devices 108A-108N, the merchant devices 110A-110N, and the promotion and marketing service 102. For example, the server 104 may be operable to receive and process budgeting data, promotion component data and target consumer profile data from promotion and marketing service 102 and location data and discretionary data from consumer devices 108A-108N. The server may also be configured to facilitate interaction among one or more members of a social network.

The database 118 may be embodied as a data storage device such as a Network Attached Storage (NAS) device or devices, or as a separate database server or servers. The database 118 includes information accessed and stored by the server 116 to facilitate the operations of the social network service 114.

The consumer devices 108A-108N may be any computing device as known in the art and operated by a consumer. The consumer devices 108A-108N may be configured to communicate with server 104 and server 116. Electronic data received by the server 104 and server 116 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102 and/or the social network service 114. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 and the social network service 114 may leverage the application framework offered by the mobile operating system to allow consumers to designate which information is provided to the app and which may then be provided to the promotion and marketing service 102 and the social network service 114. In some embodiments, consumers may "opt in" to provide particular data to the promotion and marketing service 102 and the social network service 114 in exchange for a benefit, such as improved relevancy of marketing communications offered to the user. In some embodiments, the consumer may be provided with privacy information and other terms and conditions related to the information provided to the promotion and marketing service 102 and the social network service 114 during installation or use of the app. Once the consumer provides access to a particular feature of the mobile device, information derived from that feature may be provided to the promotion and marketing service 102 and the social network service 114 to improve the quality of the consumer's interactions with the promotion and marketing service.

For example, the consumer may indicate that they wish to provide location information to the app from location services circuitry included in their mobile device. Providing this information to the promotion and marketing service 102 and the social network service 114 may enable the promotion and marketing service 102 and the social network service 114 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102 and the social network service 114. For example, the consumer may decide at a later point to disable the ability of the app to access the location services circuitry, thus limiting the access of the consumer's location information to the promotion and marketing service 102 and the social network service 114.

Additionally or alternatively, the consumer device 108 may interact through the promotion and marketing service 102 and the social network service 114 via a web browser. As yet another example, the consumer device 108 may include various hardware or firmware designed to interface with the promotion and marketing service 102 and the social network service 114 (e.g., where the consumer device 108 is a purpose-built device offered for the primary purpose of communicating with the promotion and marketing service 102 and the social network service 114, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 3.

Example Apparatus for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, social network impression management circuitry 210. The apparatus 200 may be configured to execute the operations described above with respect to FIG. 1 and below with respect to FIG. 3. Although these components 202-210 are described with respect to functional limitations, it should be understood that the particular implementations necessarily include the use of particular hardware. It should also be understood that certain of these components 202-210 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Social network impression management circuitry 210 may include hardware configured to programmatically and in real time update budgeting data, target consumer profile data, and promotion component data based on consumer transaction data, consumer redemption data, and consumer-promotion interaction data. Social network impression management circuitry 210 may utilize processing circuitry, such as the processor 202, to perform these actions. The social network impression management circuitry 210 may receive and/or access budgeting data, target consumer profile data, and promotion component data, consumer transaction data, consumer redemption data, consumer-promotion interaction data, and performance data via a network interface provided by the communications circuitry 208. However, it should also be appreciated that, in some embodiments, the social network impression management circuitry 210 may include a separate processor, specially configured field programmable gate array (FPGA), or application specific interface circuit (ASIC) to perform the identification, calculation, or determination of a particular bid amount or budget amount at a particular time. The social network impression management circuitry 210 is therefore implemented using hardware components of the apparatus configured by either hardware or software for implementing these planned functions.

Social network impression management circuitry 210 may further include hardware configured to identify, collect, collate, access, receive and/or determine performance data based on budgeting data, target consumer profile data, and promotion component data, consumer transaction data, consumer redemption data, and consumer-promotion interaction data and display the performance data or data calculated therefrom. The social network impression management circuitry 210 may utilize processing circuitry, such as the processor 202, to perform these actions. However, it should also be appreciated that, in some embodiments, the social network impression management circuitry 210 may include a separate processor, specially configured field programmable gate array (FPGA), or application specific interface circuit (ASIC) to perform the identification, collection, collation, access, reception, or determination of the performance data based on budgeting data, target consumer profile data, and promotion component data, consumer transaction data, consumer redemption data, and consumer-promotion interaction data. The social network impression management circuitry 210 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example

Electronic Marketing Information Service Data Flow

FIG. 3 depicts an example data flow 300 illustrating interactions between a server 302, one or more consumer devices 304, one or more merchant devices 306, and a social network system server 308. The server 302 and the social network system server 308 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 and social network system server 308 in accordance with embodiments of the present invention. The one or more consumer devices 304 and/or one or more merchant devices 306 may provide a variety of electronic marketing information to the server 302 and social network system server 308 for use in providing promotion and marketing services, such as for example, enabling a social network impression management system. This electronic marketing information may include, but is not limited to, location data 312, 322, clickstream data, transaction data 314, communication channel data, discretionary data 310, 320, budgeting data 330, promotion component data 332, and/or target consumer profile data 324.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, the one or more merchant devices 306 may receive electronic compensation data 338 from the server 302. For example, when a promotion or product is sold by the promotion and marketing service on behalf of the merchant, a portion of the received funds may be transmitted to the merchant. The compensation data 338 may include information sufficient to notify the merchant that such funds are being or have been transmitted. In some embodiments, the compensation data 338 may take the form of an electronic wire transfer directly to a merchant account.

The server 302 interactions with the social network system server 308 may be related to enabling a social network impression management system, thus enabling the promotion and marketing service to market their promotions, or in some embodiments, enabling a merchant to market their product's promotions, using a promotion and marketing service while leveraging the social network system server 308 of a social network service. For example, the server 302 may provide budgeting data 330, target consumer profile data 334, and promotion component data 332 to the social network system server 308. Consumer devices 304 provide discretionary data 320 and location data 322 to the social network system server 308. The social networking server 308 may then utilize information provided by the consumer devices 304 to improve the relevancy of marketing communications to individual consumers or groups of consumers. In this manner, the social networking server 308 may identify a selected groups of social network users for impression delivery based on characteristics that a social network service may have tracked, captured, extracted, identified, and/or created that are associated with a social network user.

For example, the social networking server 308 may track, capture, extract, identify, and/or create characteristics associated with the location, gender, age, or the like of a group of social network users, and provide impressions based on the characteristics matching the target consumer profile data 334.

As such, the social network system server 308 may provide a consumer device 304 with an impression targeted to particular consumer devices in accordance with budgeting data and target consumer profile data. Based on received consumer transaction data 314, consumer redemption data 316, and consumer-promotion interaction data 336, the server 302 may provide social network system server 308 with updated budgeting data 330, promotion component data 332, and target consumer profile data 334.

Embodiments advantageously provide for improvements to the server 302 by enabling the determination of updated budgeting data 330, updated promotion component data 332, and updated target consumer profile data 334 based on real time monitoring and analysis of consumer transaction data 314, consumer redemption data 316, and consumer-promotion interaction data 338.

Generation and Management Process

In some embodiments, in order to enable the programmatic and real time updating of budgeting data, promotion component data, and target consumer profile data based on consumer transaction data, consumer redemption data, and consumer-promotion interaction data, a promotion and marketing service may utilize a social network impression management system provided by, for example, a social network service. As such, FIG. 4 shows an example process that may, in some embodiments, be executed by an apparatus such as that shown in FIG. 2. The exemplary process disclosed below allows various embodiments of the present invention to programmatically and in real-time, update one or more of budgeting data, target consumer profile data, and promotion component data, based on consumer transaction data, consumer redemption data, and consumer-promotion interaction data. As shown in block 402 of FIG. 4, an apparatus, such as apparatus 200, may be configured for transmitting one or more of target consumer profile data, promotion component data, and budgeting data via a network interface, to a social network service. For example, target consumer profile data may include but is not limited to, as described above, data indicative of age, gender, income, location, time of day, operating system, internet access method or the like.

FIG. 5, which is described below shows an exemplary process that may be executed by a social network service that may receive the target consumer profile data, promotion component data, and budgeting data via the network interface. However, returning to FIG. 4, as shown in block 404 of FIG. 4, an apparatus, such as apparatus 200, may be configured for receiving, via a network interface, consumer transaction data, from one or more consumer devices. As shown in block 406 of FIG. 4, an apparatus, such as apparatus 200, may be configured for receiving, via a network interface, consumer redemption data from one or more consumer devices or merchant devices. As shown in block 408 of FIG. 4, an apparatus, such as apparatus 200, may be configured for receiving, via a network interface, consumer promotion interaction data from the social network system server. Although blocks 404, 406, and 408 are shown in one particular order, one of one of ordinary skill would readily appreciate that blocks 404, 406, and 408 may be performed in any order. In some embodiments, one or more of blocks 404, 406, or 408 may not be performed.

Once one or more of the consumer transaction data, the consumer redemption data, and the consumer-promotion interaction data is received, as shown in block 410 of Figure, an apparatus, such as apparatus 200, may be configured for determining at least one of updated target consumer profile data, updated promotion component data, and updated budgeting data based on at least one of the consumer transaction data, consumer redemption data and consumer promotion interaction data.

Subsequently, once one or more of the updated target consumer profile data, updated promotion component data, and updated budgeting data are determined based on one or more of the consumer transaction data, consumer redemption data and consumer promotion interaction data, the data may be transmitted to the social network service. As such, as shown in block 412, an apparatus, such as apparatus 200, may be configured for transmitting updated target consumer profile data via a network interface. As shown in block 414, an apparatus, such as apparatus 200, may be configured for transmitting one or more updated promotion components via a network interface. As shown in block 416, an apparatus, such as apparatus 200, may be configured for transmitting updated budgeting data elements via a network interface. Although blocks 412, 414, and 416 are shown in one particular order, one of one of ordinary skill would readily appreciate that blocks 412, 414, and 416 may be performed in any order. In some embodiments, one or more of blocks 412, 414, and 416 may not be performed.

Targeting and Adjustment Process from the Perspective of the Social Network System In some embodiments, a social network service may provide a social network impression management system in order to facilitate the enablement of the programmatic and real time updating of budgeting data, promotion component data, and target consumer profile data based on consumer transaction data, consumer redemption data, and consumer-promotion interaction data FIG. 5 shows an example process that may, in some embodiments, be executed by a social network service, or more particularly, a social network impression management system. The exemplary process disclosed allows various embodiments of the present invention to receive budgeting data, promotion component data, and target consumer profile data and identify targeted consumers, such as for example, social network users, in order to provide consumers with targeted electronic marketing communications.

As shown in block 502 of FIG. 5, an apparatus, such as apparatus 200, may be configured for receiving target consumer profile data via a network interface. As shown in block 504 of FIG. 5, an apparatus, such as apparatus 200, may be configured for receiving promotion component data via a network interface.

As shown in block 506 of FIG. 5, an apparatus, such as apparatus 200, may be configured for receiving budgeting data. In some embodiments, the budgeting data may be calculated or otherwise determined programmatically. The logic used by, for example processor 202 and stored in memory 204, for determining a bid price and/or budget may comprise one or more sets of rules, each set of rules associated with one or more specific portions of promotion component data, and, in some embodiments, associated timing data. For example, a social network impression management system may determine an initial bid price and/or initial budget using a first set of rules, and subsequently may utilize a second set of rules after a predetermined time period. In other words, once adjusted budgeting data may be determined based on a different set of rules than initial budgeting data. And, in some embodiments, adjusted budgeting data determined after a first time period may be calculated based on a different set of rules than adjusted budgeting data determined after a second time period.

As shown in block 508 of FIG. 5, an apparatus, such as apparatus 200, may be configured for comparing budgeting data to a predetermined threshold, the predetermined threshold identified in accordance with the target consumer profile data and the promotion component data and in block 510 a determination is made on whether the predetermined threshold is met. In an instance in which the threshold is not met, the promotion and marketing service is notified and budgeting data is once again received at the social network service as shown in block 506. Once the comparison is made, and in an instance in which the predetermined threshold is met, target consumers (e.g., target social network users) are identified. As such, as shown in block 512 of FIG. 5, an apparatus may be configured for identifying one or more target consumers, the one or more target consumers identified based on the target consumer profile data and the promotion component data. That is, consumers determined as having similar characteristics to the target consumer profile data and interests identified as relevant to the promotion component data are identified as target consumers. As shown in block 514 of FIG. 5, an apparatus, such as apparatus 200, may be configured for providing or placing promotions to a portion of the identified target consumers in accordance the budgeting data.

Once the promotion and marketing service receives the consumer transaction data, consumer redemption data, and consumer-promotion interaction data, the process of FIG. 5, or some portion thereof, may be repeated with updated budgeting data, promotion component data, and target consumer profile data.

Exemplary Generation and Management Process

FIG. 6 shows an example process that may, in some embodiments, be executed by an apparatus such as that shown in FIG. 2. The exemplary process disclosed below allows various embodiments of the present invention to be configured to enable users, such as a merchant or salesperson to generate and manage a social network impression management system for a particular promotion targeted to particular consumers.

The method of FIG. 6 will be described with reference to example displays 705-745 shown in FIGS. 7A-7I, respectively. FIGS. 7A-7I show example displays 705-745 that may be presented by one or more display screens of one or more devices, such as those used by a user, such as a merchant or the like, which as described above, are referred to herein as a device respectively. Again, while the example displays 705-745 are configured to be shown on a computer monitor, laptop screen, tablet computer, or other device having similar dimensions, similar interfaces may be utilized with other types of devices (e.g., mobile telephone, "smart phone") discussed herein and modified accordingly (e.g., for screen size, input device compatibly, ease of use, etc.).

Turning back to FIG. 6, blocks 602-620 show an input process for enabling the reception of promotion component data, target consumer profile data, and budgeting data by the promotion and marketing service. Accordingly, as shown in block 602 of FIG. 6, an apparatus, such as server 300, may be configured for receiving a selection indicative of ad creation or the creation of a promotion ad campaign. For example, display 705 of FIG. 7A shows a display screen that may be displayed by a device with which a promotional ad campaign may be created. The display 705 shows a portion of the screen labeled "Create an Ad", which may be selected by a merchant or salesperson intending to create a promotion ad campaign. Note that the portion may be labeled differently and not necessarily "Create an Ad".

As shown in block 604 of FIG. 6, an apparatus, such as apparatus 200, may be configured for receiving a selection indicative a geographic location. For example, display 710 of FIG. 7B shows a display screen that may be displayed by a device with which a promotional ad campaign may be created. The display 710 shows a portion of the screen labeled "Region" and is accompanied by a plurality of portions of the screen available for selection (e.g., "NA" or "EMEA"), which may be selected by a merchant or salesperson intending to create a promotion ad campaign for one of the available regions. Again, note that any of the portions may be labeled differently and any number of regions may be available for selection. Available selections may also be provided in a menu (e.g., a drop down menu or the like).

As shown in block 606 of FIG. 6, an apparatus, such as apparatus 200, may be configured for receiving a selection indicative of whether the promotion ad campaign is promotion specific or category specific. As shown in block 608 of FIG. 6, an apparatus, such as apparatus 200, may be configured for receiving an ad name. As shown in block 610 of FIG. 6, an apparatus, such as apparatus 200, may be configured for receiving a selection identifying (e.g., URL) the promotion or the category. For example, display 710 of FIG. 7B shows a display screen that may be displayed by a device with which a promotional ad campaign may be created. In some embodiments, a user may input a URL of promotion, which may be located on a website directed, managed, and/or controlled by the promotion and marketing service. In other embodiments, a service enabling a user (e.g., a merchant) to build a promotion out of promotion components may be provided, and accordingly, the promotion component data may be received. Returning to display 710, the display shows a portion of the screen labeled "Ad Type" accompanied by a plurality of selectable portions (e.g., "Promotion Specific" and "Category Based Ad"). Display 710 also shows a portion labeled "Ad Name" accompanied by a portion configured to receive input, the received input being the name of the promotion ad campaign. Display 710 also shows a portion labeled "Destination URL" accompanied by a portion configured to receive input, the received input being indicative of a location of the promotion.

In some embodiments, as shown in block 612 of FIG. 6, an apparatus, such as apparatus 200, may be configured for receiving input related to the start date, end date or duration of the promotion ad campaign. For example, display 710 shows a portion labeled "Start Date" and "End Date", each accompanied by a portion configured to receive input of a date. Here, as in some examples, instead of receiving input related to an "End Date", the apparatus may be configured to receive input indicating that the promotion ad campaign should run continuously, and as such, display 710 shows a portion of the screen labeled "Run Continuously" accompanied by a portion configured to receive selection of such.

As shown in block 614 of FIG. 6, an apparatus, such as apparatus 200, may be configured for receiving a selection or data input indicative of a target consumer group. In some embodiments, the selection or data input indicative of the target consumer group may include which device or devices are being targeted, a gender, an age or age group, a location, a radius to include in the location. For example, display 715 of FIG. 7C shows a display screen that may be displayed by a device configured for use in creating a promotion ad campaign. Display 715 shows a portion labeled "Device", "Gender, "Age", "Location" and "Radius", each accompanied by a portion configured to receive input of a selection or date related thereto.

Figures 7D, 7E:
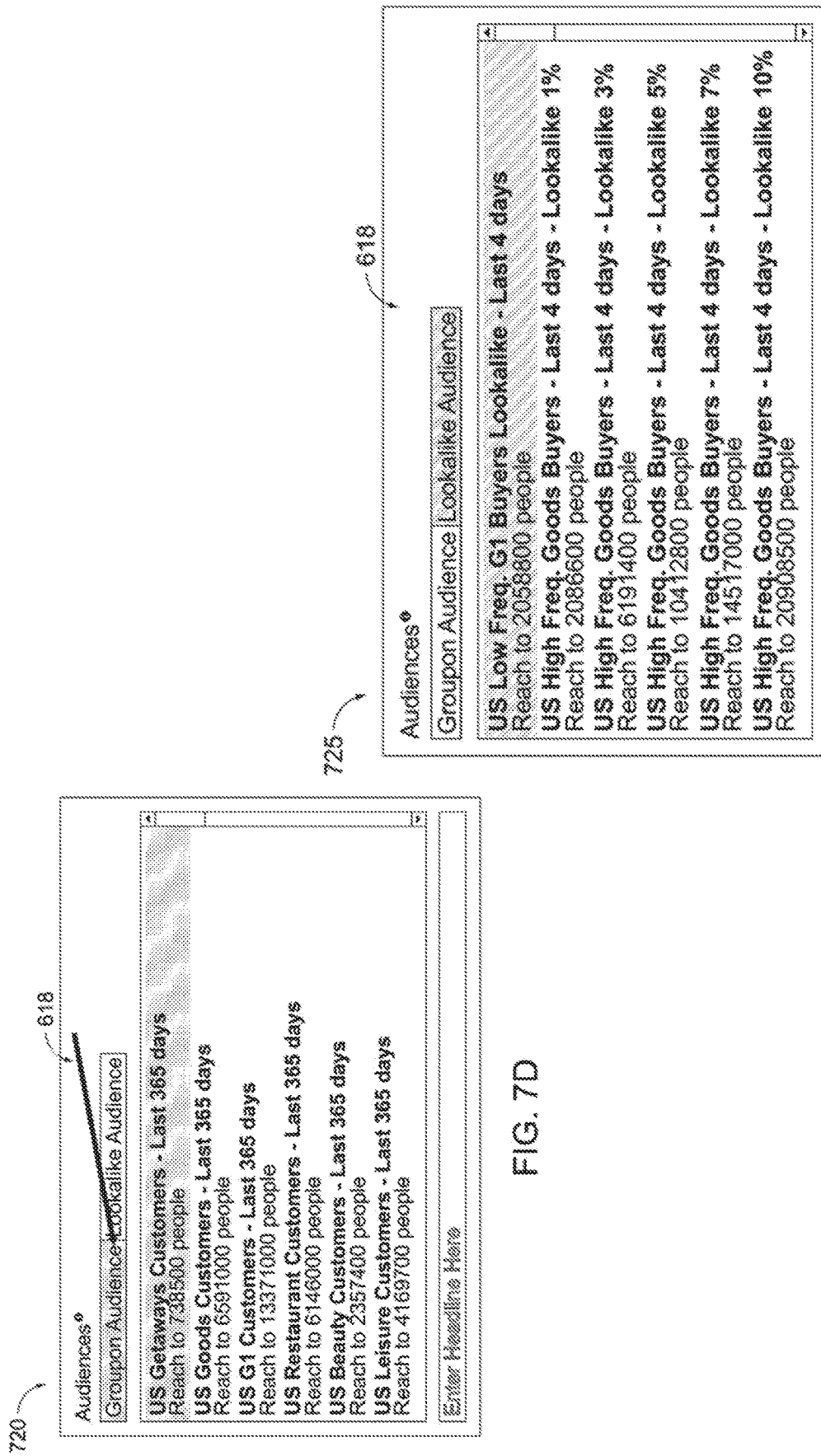

As shown in block 616 of FIG. 6, an apparatus, such as apparatus 200, may be configured for receiving a selection indicative of whether data from the promotion and marketing service is added to the campaign or if a lookalike audience should be targeted. For example, display 720 of FIG. 7D shows a display screen that may be displayed by a device configured for use in creating a promotion ad campaign. Display 720 shows a portion labeled "Audiences" accompanied by a portion configured to receive input of a selection or date related thereto. In some embodiments, a selection of which audience may be received as well as a specific sub-group within the audience as shown in FIG. 7D. In some embodiments, each sub-group may display how many people the selection of which may reach. For example, as shown in FIG. 7D, a selection of "US Getaways Customers—Last 365 days" may reach 738,500. Choosing a promotion and marketing system audience as a target may be considered retargeting, where the social network impression management system may only reach the selected audience. In some embodiments, retargeting a set of existing promotion and marketing system users is beneficial because these users have a proven interest in the promotion and marketing system and may be more open to purchasing if matched or otherwise provided with an appropriate, or, in some embodiments, relevant, deal. Choosing a lookalike audience as a target may reach users similar to a designated audience, but not the designated audience itself. The benefit of targeting lookalikes is for new customer acquisition, and as such, the social network impression management system targeting the lookalike audience may reach more users who have not yet purchased from the promotion and marketing system.

As shown in block 618 of FIG. 6, an apparatus, such as apparatus 200, may be configured for receiving a selection indicative of one or more categories to include or exclude. For example, display 725 of FIG. 7E shows a display screen that may be displayed by a device configured for use in creating a promotion ad campaign. Display 725 shows a portion labeled "Interests" accompanied by a portion configured to receive input of a selection or date related thereto. For example, Display 725 shows a selection of the category Yoga and related sub-categories configured for selection also.

Figures 7F, 7G, 7H:
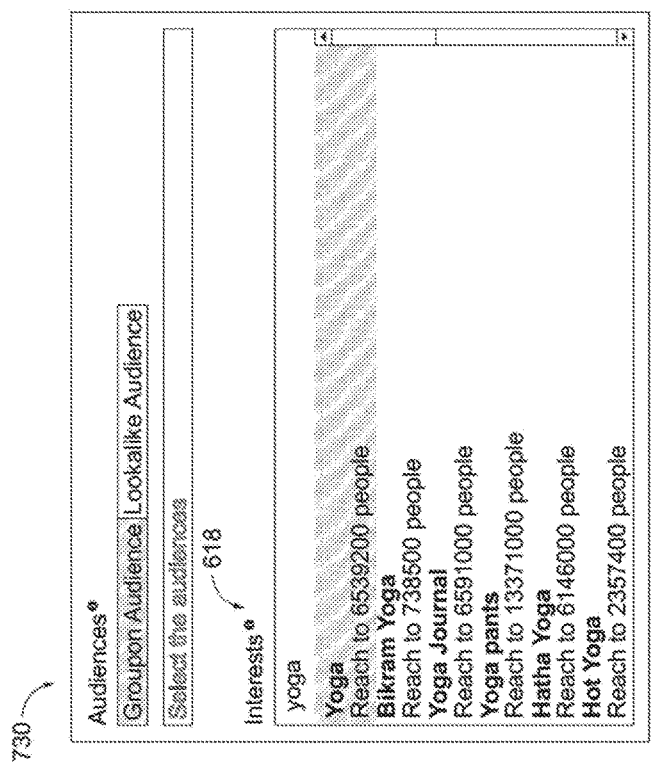

As shown in block 620 of FIG. 6, an apparatus, such as apparatus 200, may be configured for receiving information indicative of at least one of three categories (e.g., a headline, text, and description). For example, display 730 of FIG. 7G shows a display screen that may be displayed by a device configured for use in creating a promotion ad campaign. Display 730 shows a portion labeled "Headlines", "Text", and "Description", each accompanied by a portion configured to receive input of a selection or date related thereto. For example, as shown in display 735 of FIG. 7H, data may be input relating to the promotion ad campaign such as a "Headline" of "84% Discount", "Text" of "Una 3 o5 sedute con manicure e pedicure!", and a "Description" of "Sedute con manicure, pedicure applicione, smarto semipermanente".

Subsequent to providing information as described above, as shown in block 622 of FIG. 6, an apparatus, such as apparatus 200, may be configured for receiving a selection indicating the end of the information providing process (e.g., submit). Once the apparatus receives the selection indicating the submission of the information, as shown in block 624 of FIG. 6, an apparatus, such as apparatus 200, may be configured for launching the promotion ad campaign. In some embodiments, and in accordance with a social network impression management system functionality, a user may not have to specify one or more budgeting data elements. For example, an apparatus may be configured for accessing or otherwise providing one or more initial budgeting data elements. For example, the apparatus may be configured for providing one or more default elements. In some embodiments, initial (or default) budgeting data elements may be specified in, for example, a config UI, which may be maintained by, for example, the system and/or administrators of the system. Additionally, in some embodiments, for a combination of any one or more of country, platform, placement, and channel—the default budget, performance target, min & max bids, and other settings may be uniquely specified. Subsequently, in some embodiments, these defaults may then be for all campaigns created for the same country, platform, placement, and channel combination. In some embodiments, Config settings may be optimized over time, via, for example, supervised learning or the like.

In some embodiments, the user may provide a subset of the necessary budgeting data elements but not all. For example, a user may specify an initial budget (e.g., $1,000/day) but the promotion and marketing service may provide default budgeting data elements such as the maximum bid for impressions, activation, clicks or the like. In some example embodiments, a user may not provide any budgeting data and the promotion and marketing service may provide budgeting data as a function of one or more of the promotion, one or more promotion components (e.g., a category, sub-category, location), one or more elements of the target consumer profile data (e.g., higher initial budget for middle aged woman, consumers of a particular location, or any particular consumer group that may statistically spend more), or any combination thereof. Once the initial budgeting data elements are set, those elements may be provided to the social network service.

In some embodiments, as shown in block 626 of FIG. 6, an apparatus, such as apparatus 200, may be configured for initially setting a relatively high bid. For example, in some embodiments, setting a relatively high bid serves to win a maximum amount of impressions. In terms of block 626 and the bidding process, relatively high means a bid amount in the upper predefined percentage of a suggested bid amount. For example, a social network service may recommend a bid of $0.20 and a relatively high bid amount may be predefined as 25% over the recommended bid amount, and as such, in such an instance, a relatively high bid amount may be $0.25. In some embodiments, the social network service may recommend a bid amount between $0.80 and $1.30, and a relatively high bid amount may be in the predefined percentage of 10%, making the bid amount $1.20.

As shown in block 628 of FIG. 6, an apparatus, such as apparatus 200, may be configured for, after a predetermined time period (e.g., 1 hour), utilizing consumer transaction data, consumer redemption data, and consumer-promotion interaction data to calculate and/or review one or more types of performance data, and subsequently, as shown in block 630 of FIG. 6, adjusting a bid amount to optimize for attaining a predetermined threshold (e.g., CPC or solve for effective e % GR). In some embodiments, optimization may be performed automatically on a periodic (e.g., daily) basis by the system. For example, the system may evaluate the campaign's performance on the previous day(s), compare the actual performance to the performance target specified in, for example, a wizard config, and then adjust the bid price up or down as determined by, for example, a Bidding Service to align the actual performance with the target performance moving forward. Again, in some embodiments, optimization may be performed by supervised learning. As one of ordinary skill would appreciate, supervised learning is the machine learning task of inferring a function from labeled training data. The training data consist of a set of training examples, which may be, for example, historical data. In supervised learning, each example is a pair consisting of an input object (typically a vector) and a desired output value. A supervised learning algorithm analyzes the training data and produces an inferred function, which may then be used for mapping new examples. Thus, supervised learning may be utilized to correctly determine class labels for unseen instances.

One example of an optimization threshold used in the system is E % IV, or Cost divided by Incremental Value. The social network impression management system may set a threshold designating a E % IV target to be 100%, meaning for every dollar in media spend at least one dollar in Incremental Value is generated. For social network impression management systems with an E % IV<100%, their bid prices and budgets are increased. For social network impression management systems with an E % IV>100%, their bid prices and budgets may be reduced. In some embodiments, the increases/decreases may be fixed or, alternatively, in some instances, the increases/decreases may be increased or decreased based on, for example, the absolute distance from a target or the rate at which the target is approached. In an exemplary embodiment, a bidding service (e.g., a component of the system configured to determine bid prices) may be used to determine how much a CPC or CPM bid should be adjusted up or down to hit a target performance metric as the campaign continues to run. In some embodiments, the promotion and marketing service may monitor consumer transaction data, consumer redemption data, and consumer-promotion interaction data in real-time, or near real-time, and determine updated budgeting data, updated target consumer profile data and updated promotion component data in accordance therewith. In some embodiments, a supervised learning model may be utilized to determine the updated budgeting data, updated target consumer profile data and updated promotion component data determined. For example, the consumer transaction data, consumer redemption data, and consumer-promotion interaction data may be utilized in conjunction with the initial budgeting data, initial target consumer profile data and initial promotion component data to determine the updated budgeting data, updated target consumer profile data and updated promotion component data. In an exemplary embodiment, the Bidding Service may utilized performance data from past campaigns to inform its algorithms to determine the right bid price. In some embodiments, particular types of data are indicative of certain adjustments. For example, a high activation rate may be indicative of an adjustment of the budget upward, and in some embodiments, leaving the bidding strategy as is. In an exemplary embodiment, third party data (e.g., data from consumer or merchant devices) may be used before optimization logic based upon the promotion and marketing system data is available, during, for example, a preview period of time (e.g., in the first few hours). For example, a conversion may be used such that a daily budget is increased when a conversion is received during the preview period of time (e.g., within the first few hours) or, in some embodiments, after each occurrence of one or more instances of data indicative of a conversion is received.

As shown in block 632 of FIG. 6, an apparatus, such as apparatus 200, may be configured for providing performance data to aggregation module for display based on one or more types of performance data. In some embodiments the apparatus is further configured for aggregating performance data from a plurality of social network impression management system uses, receiving selection, via a communication interface, indicative of requested data type for ranking. The apparatus may then rank the aggregated performance data by the requested type of performance data. For example, display 740 of FIG. 7I shows a display screen that may be displayed by a device configured for use in viewing aggregated performance. Display 740 shows a column of "users" as well as related performance data of related promotion ad campaigns, the performance data being "Total GR", "Total Spent", "E % GR", "Activations", "Activation Rate", and "Rank".

As shown in block 634 of FIG. 6, an apparatus, such as apparatus 200, may be configured for, at a predefined stopping point, evaluating whether a predetermined threshold has been met. In an instance in which a predetermined threshold has not been met, the apparatus may be configured for returning to block 628 and 630 for continuing to review the performance data and adjust the bid amount, or in some embodiments, the target consumer profile data, the promotion component data or combination thereof. However, in an instance in which the predetermined threshold has been met, as shown in block 636 of FIG. 6, an apparatus, such as apparatus 200, may be configured for discontinuing the provision of the promotion or promotion component data. For example, by monitoring performance data such as conversion rate or cost per click, the social network impression management system may determine when to discontinue the provision of the promotion or promotion component data. For example after an initial launch, and based on monitoring performance data, the social network impression management system may determine that no conversions have been received after a designated number of clicks, and accordingly may stop the provision of the promotion or promotion component data. In another embodiment, in an instance in which the social network impression management system is not getting a predetermined impression volume at a designated CPC below a certain threshold, the social network impression management system may stop increasing bids and/or discontinue the provision of the promotion or promotion component data.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for programmatically updating budgeting data, target consumer profile data, and promotion component data for communication to a social network system, the apparatus comprising:
    a processor including one or more processing devices configured to perform independently or in tandem to execute hard-coded functions or execute software instructions;
    a user interface;
    a communications module; and
    a memory comprising one or more volatile or non-volatile electronic storage devices storing computer-readable instructions configured to programmatically update budgeting data, target consumer profile data, and promotion component data, the computer-readable instructions being configured, when executed, to cause the processor to:
    transmit, to the social network system, from a promotion and marketing system, via the communications module of the promotion and marketing system, during an impression management process, budgeting data, target consumer profile data, and promotion component data indicative of initial values of a budgeting data element, a target consumer profile data element, and a promotion component data element, respectively;
    subsequent to a delivery of impression in accordance with the initial values of the budgeting data element, the target consumer profile data element, and the promotion component data element, receive, at the promotion and marketing system, via the communications module, consumer transaction data, consumer redemption data, and consumer-promotion interaction data;
    use an inferred function generated by a supervised learning process for determining, programmatically and in real-time, via the processor, from input data comprising monitored consumer transaction data, consumer redemption data, and consumer-promotion interaction data, at least one of updated budgeting data, updated target consumer data, and updated promotion component data; and
    transmit, via the communications module, the updated budgeting data, the updated target consumer profile data, and the updated promotion component data to the social network system.

2. The apparatus of claim 1, wherein the memory stores computer-readable instructions that, when executed, cause the processor to:
    capture the consumer transaction data, the consumer redemption data, and the consumer-promotion interaction data; and
    clean the consumer transaction data, the consumer redemption data, and the consumer-promotion interaction data for utilization in the determination of the at least one of updated budgeting data, updated target consumer data, and updated promotion component data.

3. The apparatus of claim 1, wherein the memory stores computer-readable instructions that, when executed, cause the processor to:
 calculate performance data based on one or more of the consumer transaction data, the consumer redemption data, and the consumer-promotion interaction data.

4. The apparatus of claim 3, wherein the memory stores computer-readable instructions that, when executed, cause the processor to:
 at a predefined review time, access the performance data;
 compare the performance data to a predetermined threshold;
 determine, via the processor, whether the predetermined threshold is being met; and
 in an instance in which the predetermined threshold is not being met, cancel the transmission of budgeting data, target consumer profile data, and promotion component data.

5. The apparatus of claim 3, wherein the determination of one or more of the updated budgeting data, the updated target consumer data, and the updated promotion component data is based on comparison to the performance data, the performance data calculated based on at least one of the consumer transaction data, the consumer redemption data, and the consumer-promotion interaction data.

6. The apparatus of claim 3, wherein the memory stores computer-readable instructions that, when executed, cause the processor to:
 at a predefined review time, access the performance data;
 compare the performance data to a predetermined threshold in advance of the determination of the updated budgeting data, the updated target consumer data, and the updated promotion component data;
 determine, at the promotion and marketing system, whether the predetermined threshold is being met; and
 in an instance in which the predetermined threshold is being met, determining the updated budgeting data, the updated target consumer data, and the updated promotion component data.

7. The apparatus of claim 3, wherein the memory stores computer-readable instructions that, when executed, cause the processor to:
 provide display data configured for display, the display data indicative of the performance data.

8. The apparatus of claim 4, wherein the performance data is a number of conversions and the predefined review time is related to a number of clicks, and in an instance in which the number of conversions does not meet the predetermined threshold after the number of clicks has been determined, canceling the transmission of budgeting data, target consumer profile data, and promotion component data.

9. The apparatus of claim 6, wherein the performance data is an impression volume and the predefined review time is related to a cost per click, and in an instance in which the impression volume does meet the predetermined threshold at the cost per click, determining the updated budgeting data, the updated target consumer data, and the updated promotion component data.

10. The apparatus of claim 6, wherein the performance data is an activation rate and the predefined review time is related to a predetermined preview time period, and in an instance in which the activation rate does meet the predetermined threshold at the predetermined preview time period, determining the updated budgeting data, the updated budgeting data having an increased budget over a next predetermined time period.

11. The apparatus of claim 6, wherein the performance data is cost divided by incremental value and the predetermined threshold is 100%, and in an instance in which the cost divided by incremental value does meet the predetermined threshold at the predefined review time, determining the updated budgeting data, the updated budgeting data having a decreased budget until a next predefined review time.

12. A method for programmatically updating budgeting data, target consumer profile data, and promotion component data for communication to a social network system, the method comprising:
 transmitting, to the social network system, from a promotion and marketing system, via the communications module of the promotion and marketing system, during an impression management process, budgeting data, target consumer profile data, and promotion component data indicative of initial values of a budgeting data element, a target consumer profile data element, and a promotion component data element, respectively;
 subsequent to a delivery of impression in accordance with the initial values of the budgeting data element, the target consumer profile data element, and the promotion component data element, receiving, at the promotion and marketing system, via the communications module, consumer transaction data, consumer redemption data, and consumer-promotion interaction data;
 using an inferred function generated by a supervised learning process for determining, programmatically and in real-time, via the processor, from input data comprising monitored consumer transaction data, consumer redemption data, and consumer-promotion interaction data, at least one of updated budgeting data, updated target consumer data, and updated promotion component data; and
 transmitting, via the social network system interface, the updated budgeting data, the updated target consumer profile data, and the updated promotion component data to the social network system.

13. The method of claim 12, further comprising:
 capturing the consumer transaction data, the consumer redemption data, and the consumer-promotion interaction data; and
 cleaning the consumer transaction data, the consumer redemption data, and the consumer-promotion interaction data for utilization in the determination of the at least one of updated budgeting data, updated target consumer data, and updated promotion component data.

14. The method according to claim 12, further comprising:
 calculating performance data based on one or more of the consumer transaction data, the consumer redemption data, and the consumer-promotion interaction data.

15. The method according to claim 14, further comprising:
 at a predefined review time, accessing the performance data;
 comparing the performance data to a predetermined threshold;
 determining, at the promotion and marketing system, whether the predetermined threshold is being met; and in an instance in which the predetermined threshold is not being met, canceling the transmission of budgeting data, target consumer profile data, and promotion component data.

16. The method of claim 14 wherein the determination of one or more of the updated budgeting data, the updated target consumer data, and the updated promotion component data is based on comparison to the performance data, the performance data calculated based on at least one of the consumer transaction data, the consumer redemption data, and the consumer-promotion interaction data.

17. The method of claim 14, further comprising:
at a predefined review time, accessing the performance data;
comparing the performance data to a predetermined threshold in advance of the determination of the updated budgeting data, the updated target consumer data, and the updated promotion component data;
determining, at the promotion and marketing system, whether the predetermined threshold is being met; and
in an instance in which the predetermined threshold is being met, determining the updated budgeting data, the updated target consumer data, and the updated promotion component data.

18. The method of claim 14, further comprising:
providing display data configured for display, the display data indicative of the performance data.

19. The method of claim 15, wherein the performance data is a number of conversions and the predefined review time is related to a number of clicks, and in an instance in which the number of conversions does not meet the predetermined threshold after the number of clicks has been determined, canceling the transmission of budgeting data, target consumer profile data, and promotion component data.

20. The method of claim 17, wherein the performance data is an impression volume and the predefined review time is related to a cost per click, and in an instance in which the impression volume does meet the predetermined threshold at the cost per click, determining the updated budgeting data, the updated target consumer data, and the updated promotion component data.

21. The method of claim 17, wherein the performance data is an activation rate and the predefined review time is related to a predetermined preview time period, and in an instance in which the activation rate does meet the predetermined threshold at the predetermined preview time period, determining the updated budgeting data, the updated budgeting data having an increased budget over a next predetermined time period.

22. The method of claim 17, wherein the performance data is cost divided by incremental value and the predetermined threshold is 100%, and in an instance in which the cost divided by incremental value does meet the predetermined threshold at the predefined review time, determining the updated budgeting data, the updated budgeting data having a decreased budget until a next predefined review time.

23. A computer program product configured for programmatically updating budgeting data, target consumer profile data, and promotion component data for communication to a social network system, the computer program product comprising at least one non-transitory computer-readable storage medium having computer-executable program code instructions stored therein, the computer-executable program code instructions comprising program code instructions for:

transmitting, to the social network system, from a promotion and marketing system, via the communications module of the promotion and marketing system, during an impression management process, budgeting data, target consumer profile data, and promotion component data indicative of initial values of a budgeting data element, a target consumer profile data element, and a promotion component data element, respectively;
subsequent to a delivery of impression in accordance with the initial values of the budgeting data element, the target consumer profile data element, and the promotion component data element, receiving, at the promotion and marketing system, via the communications module, consumer transaction data, consumer redemption data, and consumer-promotion interaction data;
using an inferred function generated by a supervised learning process for determining, programmatically and in real-time, via the processor, from input data comprising monitored consumer transaction data, consumer redemption data, and consumer-promotion interaction data, at least one of updated budgeting data, updated target consumer data, and updated promotion component data; and
transmitting, via the social network system interface, the updated budgeting data, the updated target consumer profile data, and the updated promotion component data to the social network system.

24. The computer program product according to claim 23, wherein the computer-executable program code instructions further comprise program code instructions for:
capturing the consumer transaction data, the consumer redemption data, and the consumer-promotion interaction data; and
cleaning the consumer transaction data, the consumer redemption data, and the consumer-promotion interaction data for utilization in the determination of the at least one of updated budgeting data, updated target consumer data, and updated promotion component data.

25. The computer program product according to claim 23, wherein the computer-executable program code instructions further comprise program code instructions for:
calculating performance data based on one or more of the consumer transaction data, the consumer redemption data, and the consumer-promotion interaction data.

26. The computer program product according to claim 25, wherein the computer-executable program code instructions further comprise program code instructions for:
at a predefined review time, accessing the performance data;
comparing the performance data to a predetermined threshold;
determining, at the promotion and marketing system, whether the predetermined threshold is being met; and
in an instance in which the predetermined threshold is not being met, canceling the transmission of budgeting data, target consumer profile data, and promotion component data.

27. The computer program product according to claim 25, wherein the determination of one or more of the updated budgeting data, the updated target consumer data, and the updated promotion component data is based on comparison to the performance data, the performance data calculated based on at least one of the consumer transaction data, the consumer redemption data, and the consumer-promotion interaction data.

28. The computer program product according to claim 25, wherein the computer-executable program code instructions further comprise program code instructions for:

at a predefined review time, accessing the performance data;

comparing the performance data to a predetermined threshold in advance of the determination of the updated budgeting data, the updated target consumer data, and the updated promotion component data;

determining, at the promotion and marketing system, whether the predetermined threshold is being met; and in an instance in which the predetermined threshold is being met, determining the updated budgeting data, the updated target consumer data, and the updated promotion component data.

29. The computer program product according to claim 25, wherein the computer-executable program code instructions further comprise program code instructions for:

providing display data configured for display, the display data indicative of the performance data.

30. The computer program product according to claim 26, wherein the performance data is a number of conversions and the predefined review time is related to a number of clicks, and in an instance in which the number of conversions does not meet the predetermined threshold after the number of clicks has been determined, canceling the transmission of budgeting data, target consumer profile data, and promotion component data.

31. The computer program product according to claim 28, wherein the performance data is an impression volume and the predefined review time is related to a cost per click, and in an instance in which the impression volume does meet the predetermined threshold at the cost per click, determining the updated budgeting data, the updated target consumer data, and the updated promotion component data.

32. The computer program product according to claim 28, wherein the performance data is an activation rate and the predefined review time is related to a predetermined preview time period, and in an instance in which the activation rate does meet the predetermined threshold at the predetermined preview time period, determining the updated budgeting data, the updated budgeting data having an increased budget over a next predetermined time period.

33. The computer program product according to claim 28, wherein the performance data is cost divided by incremental value and the predetermined threshold is 100%, and in an instance in which the cost divided by incremental value does meet the predetermined threshold at the predefined review time, determining the updated budgeting data, the updated budgeting data having a decreased budget until a next predefined review time.

* * * * *